Sept. 23, 1941.    D. E. SEXTON    2,256,965
REMOTE CONTROL FOR CAMERA SHUTTERS
Filed June 3, 1940
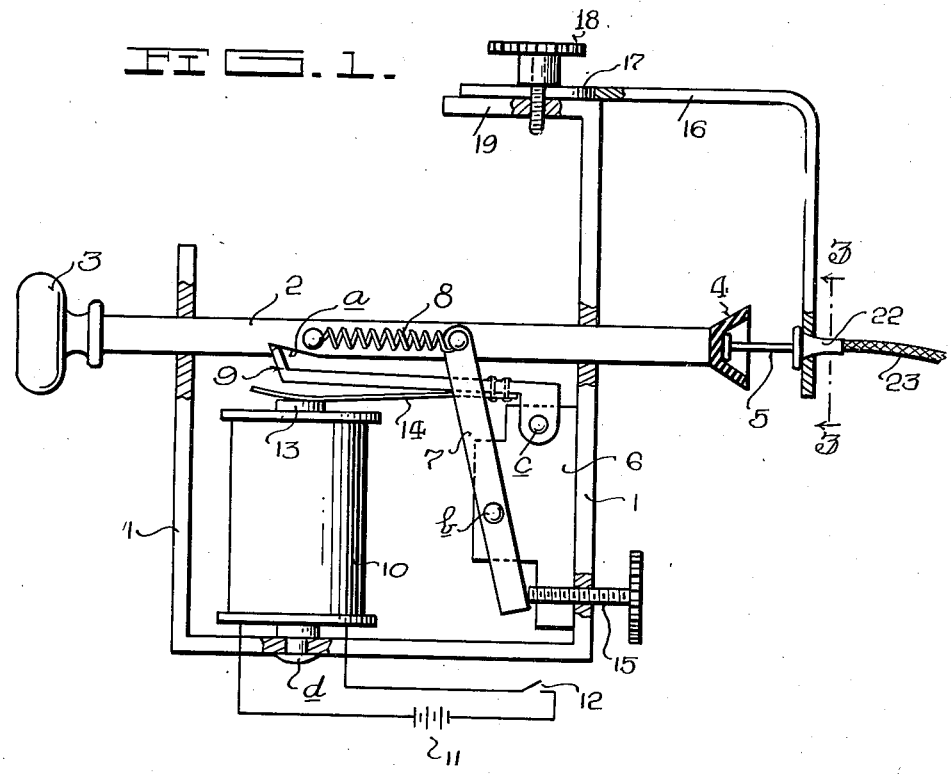
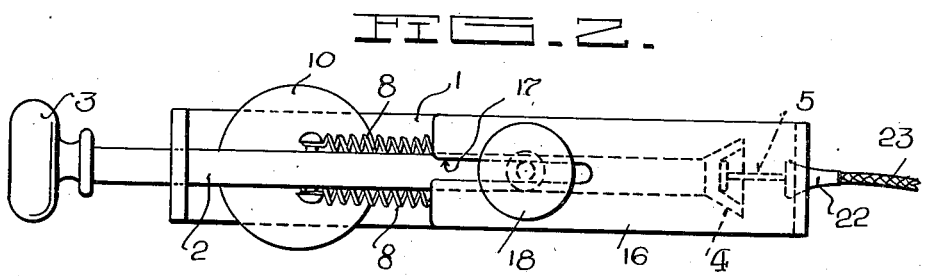
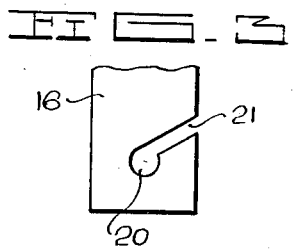
Delaney E. Sexton
INVENTOR.
BY
ATTORNEY.

Patented Sept. 23, 1941

2,256,965

UNITED STATES PATENT OFFICE 2,256,965

REMOTE CONTROL FOR CAMERA SHUTTERS

Delaney E. Sexton, Hollywood, Calif.

Application June 3, 1940, Serial No. 338,667

1 Claim. (Cl. 74—2)

This invention relates to cameras and it has particular reference to a device for actuating the camera shutter from a remote point.

The principal object of the invention is to provide a simple and highly efficient means by which one may take a picture of one's self without aid after having properly positioned and focused the camera.

Another object of the invention resides in the provision of simple electrically actuated means for operating the shutter release cable and further, a means for varying the tension on the said operating means in accordance with the tension of the shutter of a camera to which the invention may be attached.

The invention is provided with means by which it may be quickly and firmly connected to the shutter release cable of a camera. Moreover, the invention is of such compact proportions as to enable it to be conveniently carried in the pocket or camera case.

With the foregoing objects as paramount, the invention has particular reference to its salient features of construction and arrangement of parts which will become manifest as the description proceeds, taken in connection with the accompanying drawing, wherein:

Figure 1 is a side elevational view of a device constructed according to the present invention.

Figure 2 is a plan view thereof, and

Figure 3 is a fragmentary view of the bracket for retaining the shutter release cable, taken on line 3—3 on Figure 1.

Continuing with a more detailed description of the drawing, 1 designates a frame which may be encased in a suitable housing, not shown. The frame includes two parallel end members, apertured to receive a plunger 2, capable of axial movement. One end of this plunger carries a knob 3 while the opposite end carries a cup 4 of rubber or similar material, adapted to receive the end of the shutter release cable 5 of a camera, not shown. It is to be noted that the plunger is notched at $a$ for a purpose which will become apparent presently.

A block of Bakelite or similar material is affixed to one end of the frame and to this block is pivoted at $b$ a substantially U-shaped bracket 7, the free upper ends lying on either side of the plunger 2, as shown. Springs 8 are provided, one end of each being connected to an end of the bracket 7, with the opposite end connected to the plunger 2, thereby causing the latter to be thrust against the end of the shutter cable 5, when released.

In order to hold the plunger against the tension of springs 8, an armature 9 is pivoted at $c$ to the block 6 with its free end lying in the notch $a$ of the plunger.

Disposed below the free end of the armature 9 is an electro-magnetic coil 10, fixed at $d$ to the frame 1. An electrical circuit is completed from an automobile storage battery or other source 11 through the coil 10 when the switch 12 is closed. When thus energized, the core 13 will attract the armature against the resistance of the leaf spring 14, withdrawing the armature from its engagement with the plunger 2, releasing the latter to the tension of springs 8. When this occurs, the plunger will bear upon the end of cable 5 to operate the camera shutter for an exposure of the film. The spring 14 normally urges the armature upward whereby all that is required to reset the device is to pull the plunger back to its original position and the spring will cause the armature to drop back into the notch $a$.

In order to adjust the springs 8 to the required tension to correspond with that of a particular camera shutter, a set screw 15 is threaded through the frame and bears against the lower portion of bracket 7. By adjusting this screw, tension of the springs on the plunger is increased or decreased, as desired.

It is to be understood that since the armature 9 is pivoted to the Bakelite block 6, a complete magnetic circuit cannot be formed between the core of the coil and armature, assuring more efficient operation. Moreover, the leaf spring 14 is of non-magnetic material and creates a complete non-magnetic air gap, as it rests directly on the coil core and the bottom of the armature when the latter is drawn toward the coil, thus preventing a direct contact between the armature, which is of magnetic material and the core of the coil, thereby preventing residual magnetism from releasing the armature to normal position.

A portion of the frame 1 is constructed to support a bracket 16, the latter being slotted at 17 to receive a set screw 18 which is threaded into portion 19 of the frame. The opposite end of this bracket 16 is bent parallel to the frame and is apertured at 20 (Figure 3) with a communicating slot 21 to receive the end 22 of the sheath 23, the slot being provided to enable the end of the sheath to be more conveniently mounted in the aperture. The adjustment afforded by the slot 17 in the opposite end of the bracket 16 takes up unnecessary slack in the cable 5 between the cup 4 and bracket 16. Also, since all camera shutter release cables are not of the same size but are of the same general design, this adjustment will compensate for any differences as to size and length.

Manifestly, the construction as shown and described is capable of some modification and such modification as may be construed to fall within the scope and meaning of the appended claim is also considered to be within the spirit and intent of the invention.

What is claimed is:

A device for operating the shutter release cable of a camera including a frame, a plunger reciprocably mounted in said frame and provided with a recess intermediate its ends, a bracket mounted on said frame for holding the sheath of said shutter release cable whereby to hold the latter adjustably in operative relation with one end of said plunger, a second bracket pivoted intermediate its ends to said frame, springs connected at one end to one end of said pivoted bracket and at their opposite ends to said plunger for urging the latter toward and against the end of said cable, means bearing against the opposite end of said second bracket to adjust the tension of said spring, an electro-magnet, an armature engageable with the recess of said plunger for resisting the action of said springs on said plunger, means for energizing said magnet to attract said armature to release the same from said plunger and resilient means attending said armature for normally urging the same into position for reengagement with said plunger recess.

DELANEY E. SEXTON.